US006405810B1

(12) United States Patent
Grach et al.

(10) Patent No.: US 6,405,810 B1
(45) Date of Patent: Jun. 18, 2002

(54) METHOD OF LUBRICATING AND LUBRICANT SPRAYING APPARATUS

(75) Inventors: Ayzik Grach, Chesterfield; David C. Beck, St. Peters, both of MO (US); Christopher D. Holland, Wood River, IL (US)

(73) Assignee: Lincoln Industrial Corporation, St. Louis, MO (US)

( * ) Notice: Subject to any disclaimer, the term of this patent is extended or adjusted under 35 U.S.C. 154(b) by 0 days.

(21) Appl. No.: 09/450,916

(22) Filed: Nov. 29, 1999

Related U.S. Application Data

(63) Continuation-in-part of application No. 09/382,739, filed on Aug. 25, 1999.

(51) Int. Cl.[7] ............................... F21B 17/00
(52) U.S. Cl. ................ 175/52; 184/7.4; 184/15.3; 184/6; 222/262
(58) Field of Search ............... 184/7.4, 15.3, 184/6, 35.1; 222/249, 250, 262; 175/52, 85; 166/84.1

(56) References Cited

U.S. PATENT DOCUMENTS

| | | |
|---|---|---|
| 1,995,342 A | 3/1935 | Dirkes |
| 2,254,274 A | 9/1941 | Doe |
| 2,462,642 A | 2/1949 | Jacobson et al. |
| 2,498,407 A | 2/1950 | Fine |
| 2,642,034 A | 6/1953 | Griffin et al. |
| 2,760,585 A | 8/1956 | Bergeron |
| 3,216,627 A | 11/1965 | Best et al. |
| 3,353,712 A | 11/1967 | Prescott |
| 3,455,487 A | 7/1969 | Crippen et al. |
| 3,487,891 A | 1/1970 | Pickle ................ 184/6 |
| 3,595,342 A | 7/1971 | O'Leary ............... 184/56 |
| 3,604,534 A | 9/1971 | Whitaker .............. 184/7 |
| 3,609,066 A | 9/1971 | Wegmann .............. 417/344 |
| 3,830,405 A | 8/1974 | Jaeger |
| 3,882,882 A | 5/1975 | Preisig |

(List continued on next page.)

FOREIGN PATENT DOCUMENTS

| | | |
|---|---|---|
| DE | DD 252 869 A1 | 12/1987 |
| DE | DD 253 467 A1 | 1/1988 |
| EP | 0 140 265 A2 | 5/1985 |
| FR | 2 268 222 | 11/1975 |
| FR | 2 403 512 | 4/1979 |
| WO | WO 99/60245 | 11/1999 |
| WO | WO 00/14375 | 3/2000 |
| WO | WO 01/11181 A1 | 2/2001 |
| WO | WO 01/11181 * | 2/2001 ........... E21B/17/00 |

OTHER PUBLICATIONS

UniJet System Catalog insert, spraying Systems co. UniJet Spray Nozzle Tip (pre-dates invention).

Vermeer Brochure, Directional Boring System, Navigator, D24X40A, dated 1997.

Document entitled "Lincoln Open Gear Spray," undated, 1 page; admitted by Applicants to be prior art as referenced in Third Supplement Information Disclosure Statement.

PYLES® Division, Sealed Power Corporation, "Automatic Tank Re-Fill System," 1987, 4 pages.

*Primary Examiner*—William Neuder
(74) *Attorney, Agent, or Firm*—Senniger, Powers, Leavitt & Roedel

(57) ABSTRACT

This invention is directed to a method of lubricating an object. The method involves the steps of spraying lubricant on a rotating object, and synchronizing the duration of spray to the rotation of the object so that the spray continues only for an interval of spray time corresponding to rotation of the object through a predetermined range of rotation. Apparatus for spraying lubricant on a rotating object is also disclosed.

58 Claims, 9 Drawing Sheets

U.S. PATENT DOCUMENTS

| | | | |
|---|---|---|---|
| 3,884,391 A | 5/1975 | Pauliukonis | |
| 3,913,797 A | 10/1975 | Brym | 222/253 |
| 3,966,019 A | 6/1976 | Heikkilä et al. | 184/7 |
| 4,027,744 A | 6/1977 | Kühnelt et al. | |
| 4,090,964 A | 5/1978 | Bakken et al. | |
| 4,157,132 A | 6/1979 | Kramer | 184/7 |
| 4,199,858 A | 4/1980 | Meijs | |
| 4,413,647 A | 11/1983 | DeLorenzo et al. | |
| 4,508,183 A | 4/1985 | Drummond et al. | 175/69 |
| 4,736,873 A | 4/1988 | Patriquin | |
| 4,759,427 A | 7/1988 | Onose et al. | 184/6.26 |
| 4,821,799 A * | 4/1989 | Wong | 166/84 |
| 4,895,205 A | 1/1990 | Thompson et al. | |
| 4,911,267 A | 3/1990 | Matsuda et al. | |
| 4,988,015 A | 1/1991 | Price | |
| 5,018,601 A | 5/1991 | Waddington et al. | |
| 5,038,893 A | 8/1991 | Willner et al. | 184/7.4 |
| 5,060,761 A | 10/1991 | Arndt et al. | 184/6.14 |
| 5,285,871 A | 2/1994 | Sievenpiper | 184/7.4 |
| 5,404,920 A | 4/1995 | Custer | |
| 5,476,193 A | 12/1995 | Haynes | |
| 5,497,852 A | 3/1996 | Little et al. | |
| 5,518,076 A * | 5/1996 | Holz et al. | 175/57 |
| 5,556,007 A | 9/1996 | Breitsprecher | |
| 5,779,098 A | 7/1998 | Fancher | |
| 5,857,476 A | 1/1999 | Bee et al. | |
| 5,924,602 A | 7/1999 | Brown et al. | |
| 6,179,065 B1 * | 1/2001 | Payne et al. | 175/24 |

\* cited by examiner

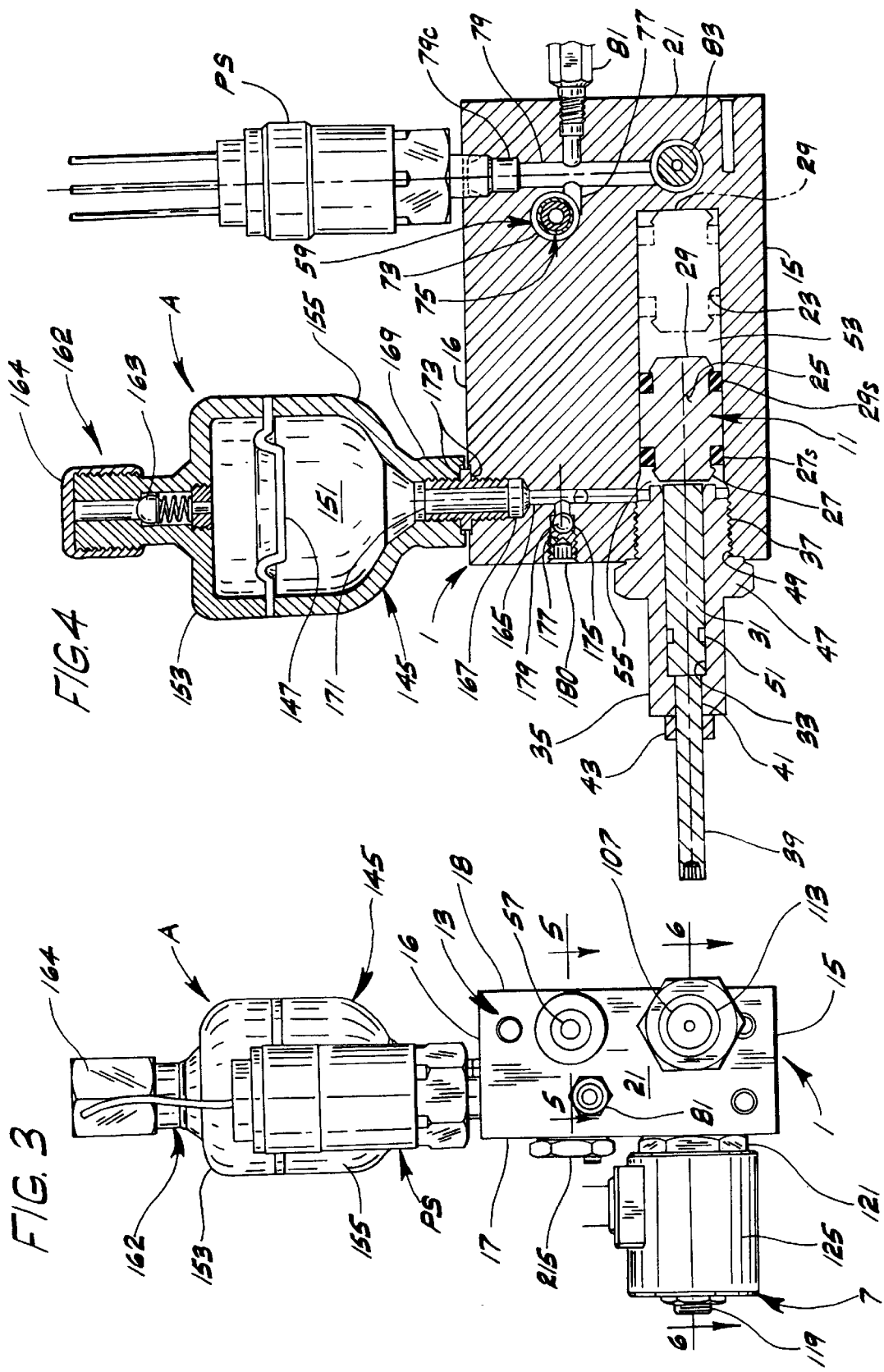

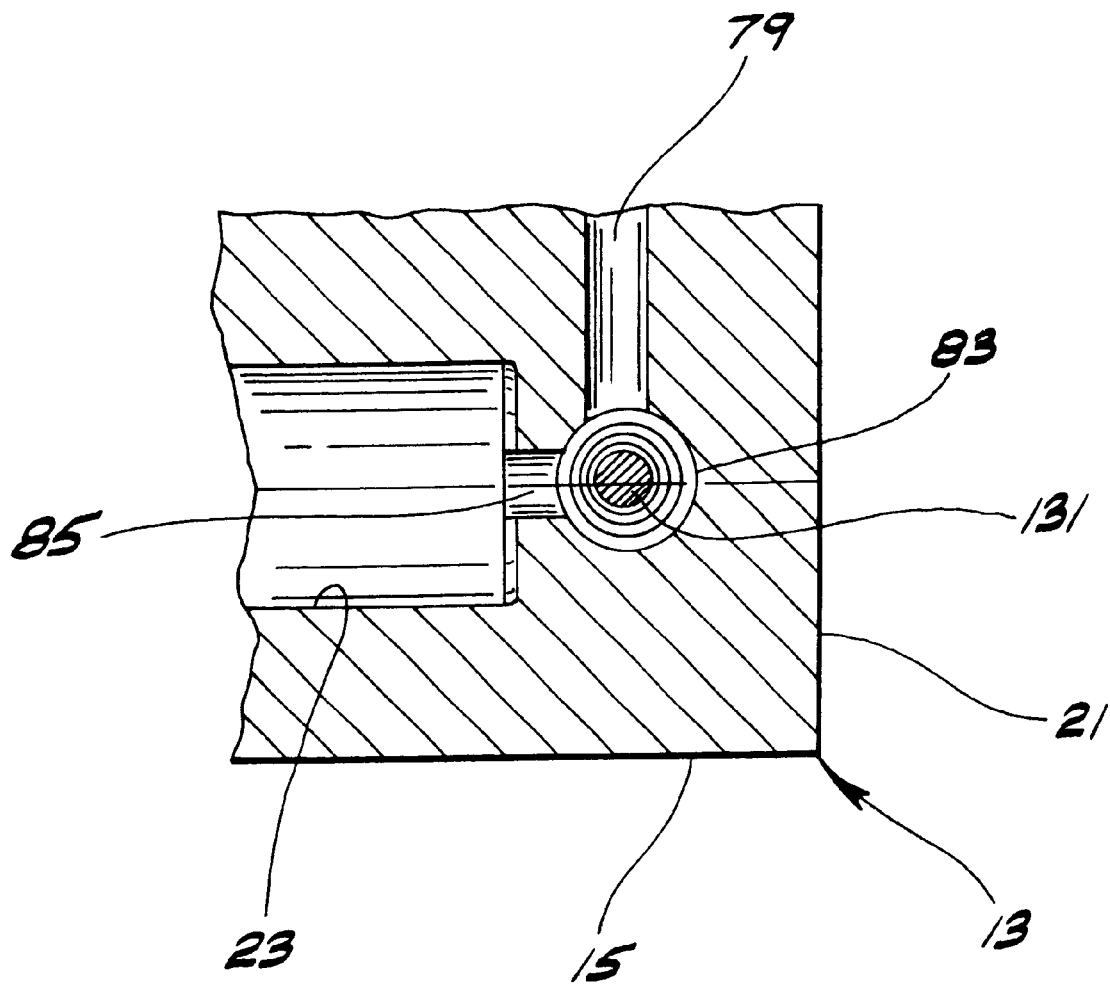

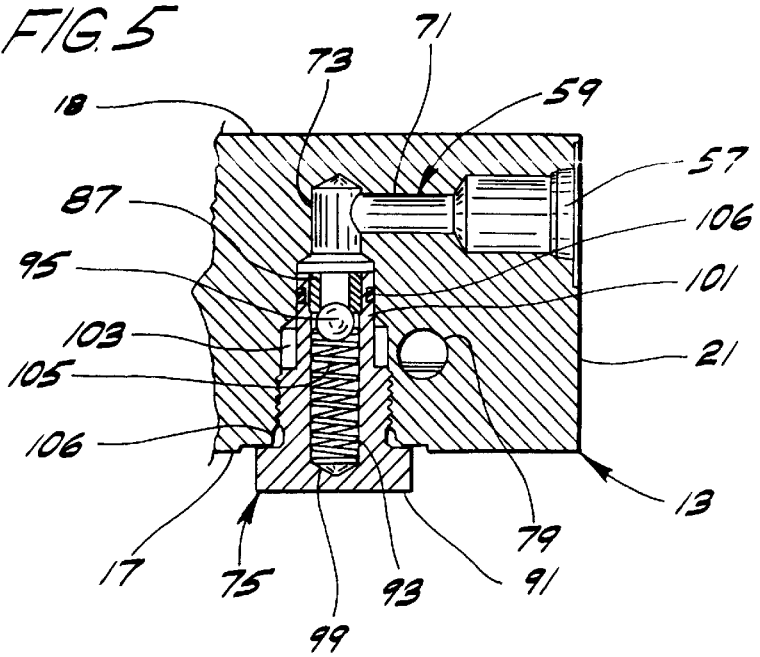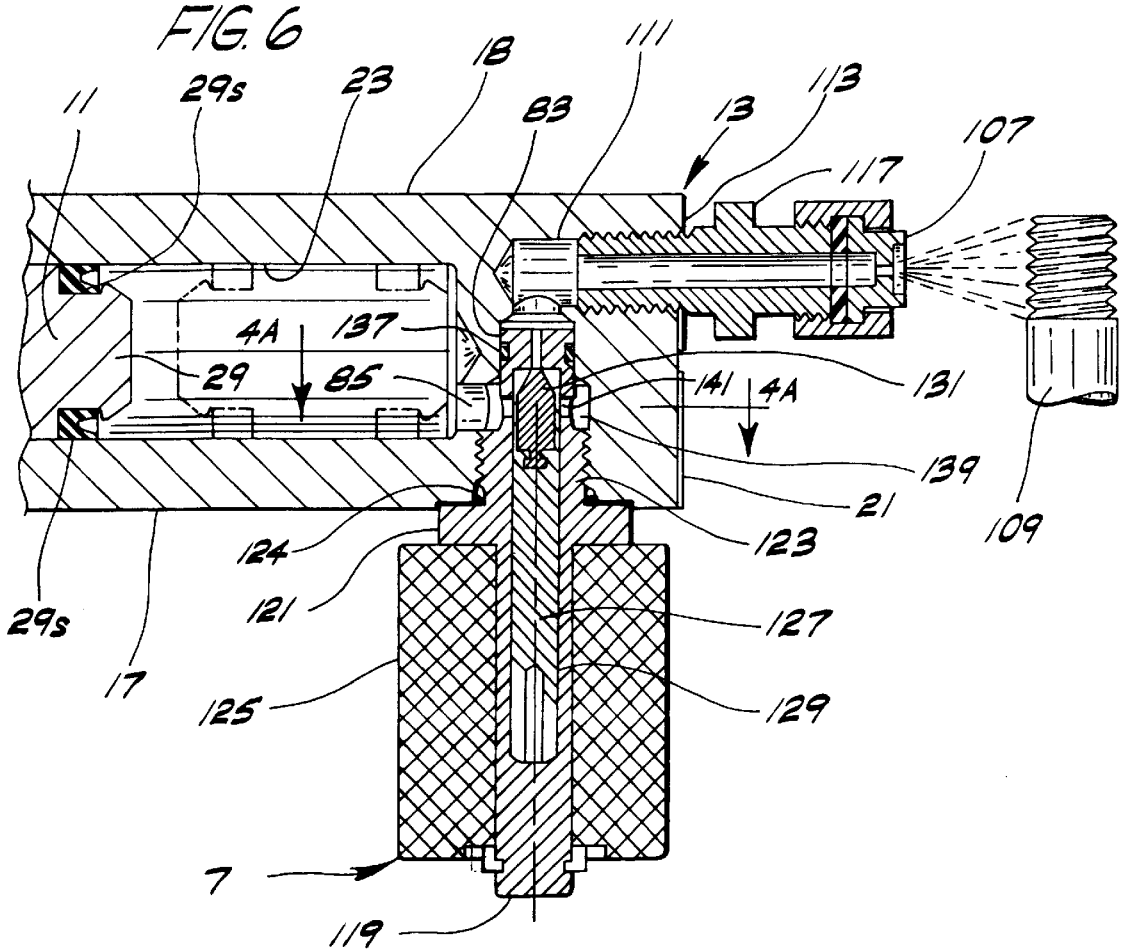

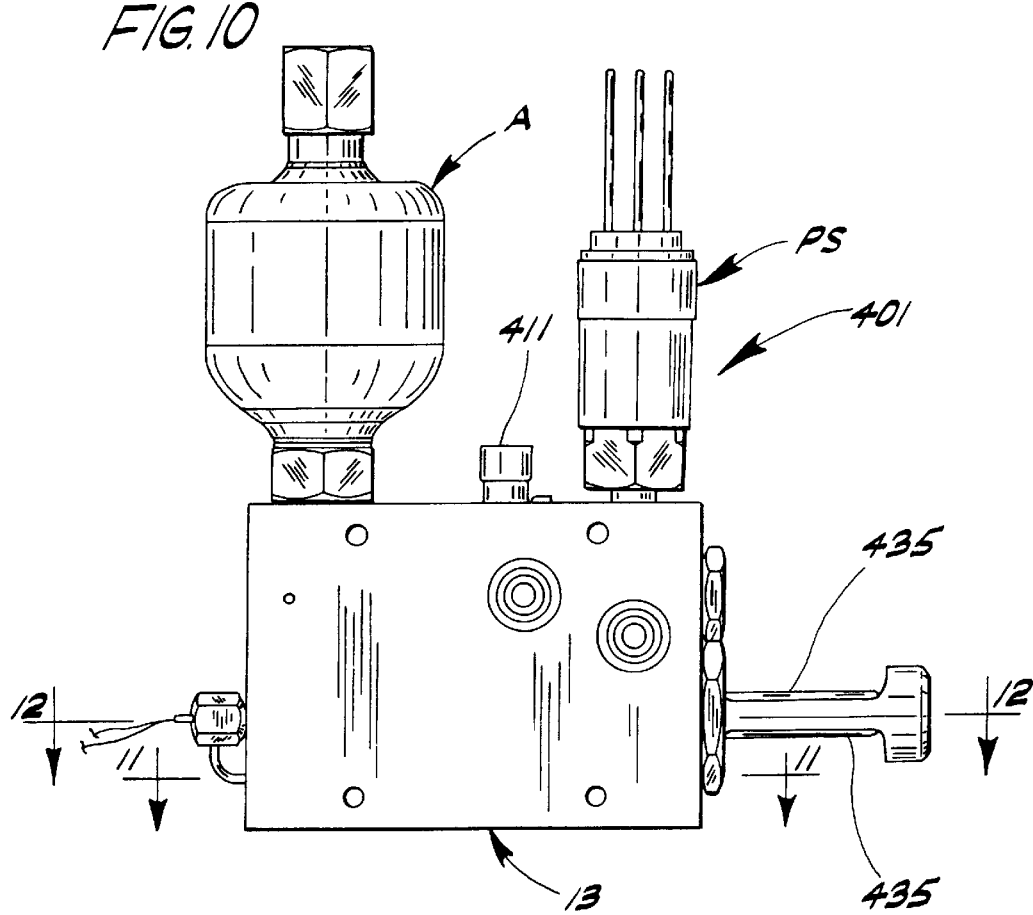
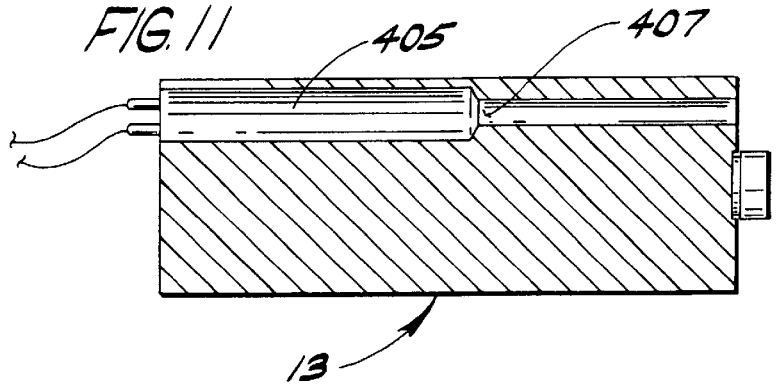
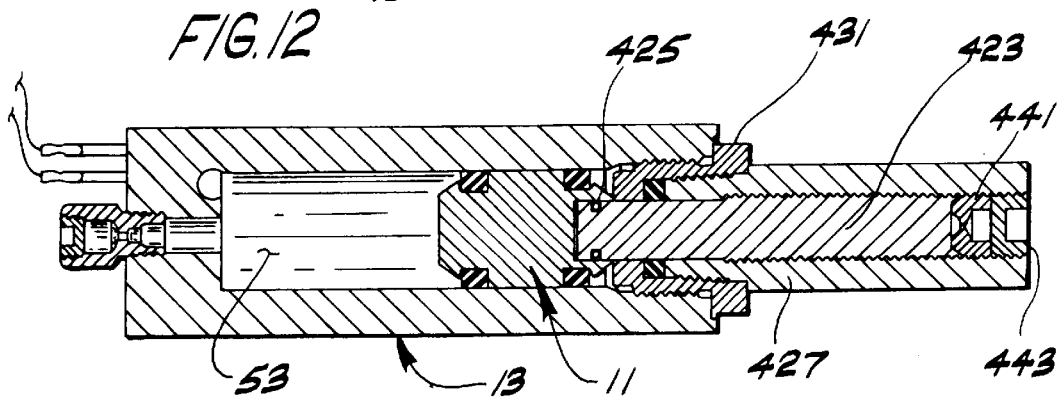

METHOD OF LUBRICATING AND LUBRICANT SPRAYING APPARATUS

CROSS-REFERENCE TO RELATED APPLICATION

This application is a continuation-in-part of pending U.S. application Ser. No. 09/382,739 filed Aug. 25, 1999.

BACKGROUND OF THE INVENTION

This invention relates in general to fluid dispensing apparatus, and more particularly to a method of and apparatus for lubricating an object by spraying the lubricant on the object.

The invention has been developed primarily though not exclusively as a means for efficiently and reliably carrying out in the field the lubrication of threaded connections of drill tubes used to bore long holes used in various operations ranging from oil and gas exploration to communication cable installation, lubrication of the threaded connections facilitating the end-to-end assembly of the drill tubes. Heretofore, lubrication of such connections has generally been carried out either manually or (frequently inadequately) with air-operated pumps. Manual lubrication requires the drilling operator to lose productive time by having to get out of his cab to apply the lubricant to the threaded connection by hand. Application by use of air-operated pumps to spray the lubricant on the threaded connections is generally ineffective to provide a good quality spray at temperatures ranging from +160° F (+71° C.) to −20° F. (−29° C.); at low temperatures air-operated pumps may even become inoperable. The invention has also taken into account the problem that certain zinc or copper-based greases specially formulated for lubricating drill tube connections are very difficult to pump and spray, and the further problem that prior methods of application have sometimes resulted in applying too much or too little lubricant to the connections.

SUMMARY OF THE INVENTION

Accordingly, among the several objects of the invention may be noted the provision of lubricant dispensing apparatus particularly for reliably and efficiently spraying lubricant on the threaded connections of drill tubes or open gears, even at low temperatures in the field, and enabling use of the aforesaid specially formulated lubricants; the provision of such apparatus which is readily adjustable to dispense or spray charges of lubricant of different selected volumes (ranging, for example, from 0.5 cubic inch to 2.00 cubic inches); the provision of such apparatus which obtains power for a spraying operation solely from pressure of lubricant supplied thereto; the provision of a method of spraying lubricant on a rotating object, including (but not limited to drill tube threads), with the duration of spray being synchronized with the rotation of the object to provide for a more accurate distribution of lubricant on the object; the provision of such a method which is applicable to spraying lubricant on the drill tube of a directional boring machine and other drilling/boring machines; and the provision of apparatus for carrying out the aforementioned method; and the provision of such method and apparatus in which the pattern, pressure, volume and duration of spray are controllable, as required by circumstances; and the provision of such apparatus which is readily mountable on a drilling/boring machine for applying lubricant to the threaded connections of the drill tube sections.

While the invention as it has been developed has been embodied in apparatus for spraying a charge of lubricant on a blast drill tube threaded connection, it is to be understood that the principles of the invention are also applicable to dispensing apparatus for fluids other than lubricants, for example sealants and adhesives, and to dispensing apparatus useful in packaging operations for dispensing measured or metered charges of fluid to packages. The term "fluid" as used herein is intended to cover principally any non-gaseous fluid, including viscous fluids such as greases.

In general, a method of the present invention involves the steps of spraying lubricant on a rotating object, and synchronizing the duration of spray to the rotation of the object so that the spray continues only for an interval of spray time corresponding to rotation of the object through a predetermined range of rotation.

Lubricant spray apparatus of the present invention can be used for spraying a rotating object with lubricant. The apparatus comprises a dispenser for spraying a volume of lubricant adapted for connection in a system for supplying lubricant under pressure to the dispenser for charging it with lubricant to be sprayed. The apparatus further comprises a delivery system for delivery of said volume of lubricant to be sprayed by the dispenser, including a discharge valve adapted to be closed for the charging of the dispenser and to be opened for spraying said volume; and a controller for controlling the timing of the opening and closing of the discharge valve so that the spray continues only for an interval of spray time corresponding to rotation of the object through a predetermined range of rotation.

In another aspect, this invention is directed to a directional boring machine for rotating a drill rod comprising a series of separate longitudinal sections having threaded ends for connection of the sections end-to-end. The boring machine comprises a chassis, a system for rotating the drill rod relative to the chassis, and dispensing apparatus mounted on the chassis for spraying lubricant on the threaded end of a drill rod section as it rotates.

In one embodiment, a lubrication system of this invention dispenses a lubricant to threads of a drill tube of a horizontal directional boring machine. The lubrication system comprises a pumping system comprising a lubricant reservoir, a pump, an applicator, and a lubricant supply conduit coupled between the pump and the applicator. A controller coupled to the pumping system is operable in response to an operator signal to activate the pumping system to dispense lubricant over a circumferential surface of the threads of the drill tube.

In a further aspect, a method of the present invention dispenses a lubricant on the threads of a drill tube held by a chuck of a horizontal directional boring machine. The method comprises rotating the chuck and/or drill tube, dispensing lubricant to the threads of the drill tube, and controlling the dispensing of lubricant to dispense lubricant over a circumferential surface of the threads of the drill tube.

In yet a further aspect, a lubrication system of the invention dispenses a lubricant to threads of a drill tube of a horizontal directional boring machine. The system comprises a pumping system comprising a lubricant reservoir, a pump, an applicator, and a lubricant supply conduit coupled between the pump and applicator. A heater is coupled to the pumping system, the heater heating lubricant within the pumping system. A controller is coupled to the pumping system. In response to an operator signal, the controller activates the pumping system to dispense a volume of lubricant from the applicator to the threads of the drill tube.

In another embodiment, a lubrication system of the invention comprises a body defining an expansible and contractible chamber, a pump for pumping lubricant to the chamber, a spray nozzle in communication with the chamber, and a device for contracting the chamber to force lubricant out of the chamber and through the spray nozzle at a pressure sufficient to effect spraying of the lubricant, without mixing the lubricant with air under pressure, on a part to be lubricated.

In still a further aspect, a directional boring machine of the present invention rotates a drill tube comprising a series of longitudinal sections having threaded ends for connection of the sections end-to-end. The boring machine comprises a chassis, a system for rotating a drill tube section, and dispensing apparatus mounted on the machine for spraying lubricant on the threaded end of the drill tube as it rotates. The dispensing apparatus comprises a body defining an expansible and contractible chamber, a pump for pumping lubricant to the chamber, a spray nozzle in communication with the chamber, and a device for contracting the chamber to force lubricant out of the chamber and through the spray nozzle at a pressure sufficient to effect spraying of the lubricant, without mixing the lubricant with air under pressure, on a part to be lubricated.

In another embodiment, a method of this invention involves spraying a part with lubricant. The method comprises pumping lubricant to an expansible and contractible chamber thereby to fill the chamber, and contracting the chamber to force lubricant out of the chamber and through a spray nozzle at a pressure sufficient to effect spraying of the lubricant on the part without mixing the lubricant with air under pressure.

Other objects and features will be in part apparent and in part pointed out hereinafter.

BRIEF DESCRIPTION OF THE DRAWINGS

FIG. 3 is a view in end elevation of the dispenser as viewed from the right of FIGS. 1 and 2 (a view of what may be referred to as its forward end);

FIG. 4 is a view in vertical longitudinal cross section in part (the upper part) on a vertical longitudinal plane through the center of the accumulator and a pressure switch of the apparatus and in part (the lower part) on a vertical longitudinal plane through the axis of a cylinder of the apparatus, these planes being offset one from the other;

FIG. 4A is a fragmentary vertical section generally on line 4A—4A of FIG. 6 illustrating a port for entrance and exit of fluid (lubricant) to and from the cylinder;

FIG. 5 is a fragmentary horizontal transverse section taken generally on line 5—5 of FIG. 3;

FIG. 6 is a fragmentary horizontal transverse section taken generally on line 6—6 of FIG. 3, showing diagrammatically in phantom an outlet line extending from the outlet of the dispenser to a spray nozzle positioned to spray lubricant on a threaded connection;

FIG. 10 is a view similar to FIG. 1 showing an alternative embodiment of the dispenser;

FIG. 11 is a sectional view along lines 11—11 of FIG. 10 showing a heater mounted in the body of the dispenser;

FIG. 12 is a sectional view along lines 12—12 of FIG. 10; and

Corresponding reference characters indicate corresponding parts throughout several views of the drawings.

DETAILED DESCRIPTION OF THE PREFERRED EMBODIMENT

Figure 7:
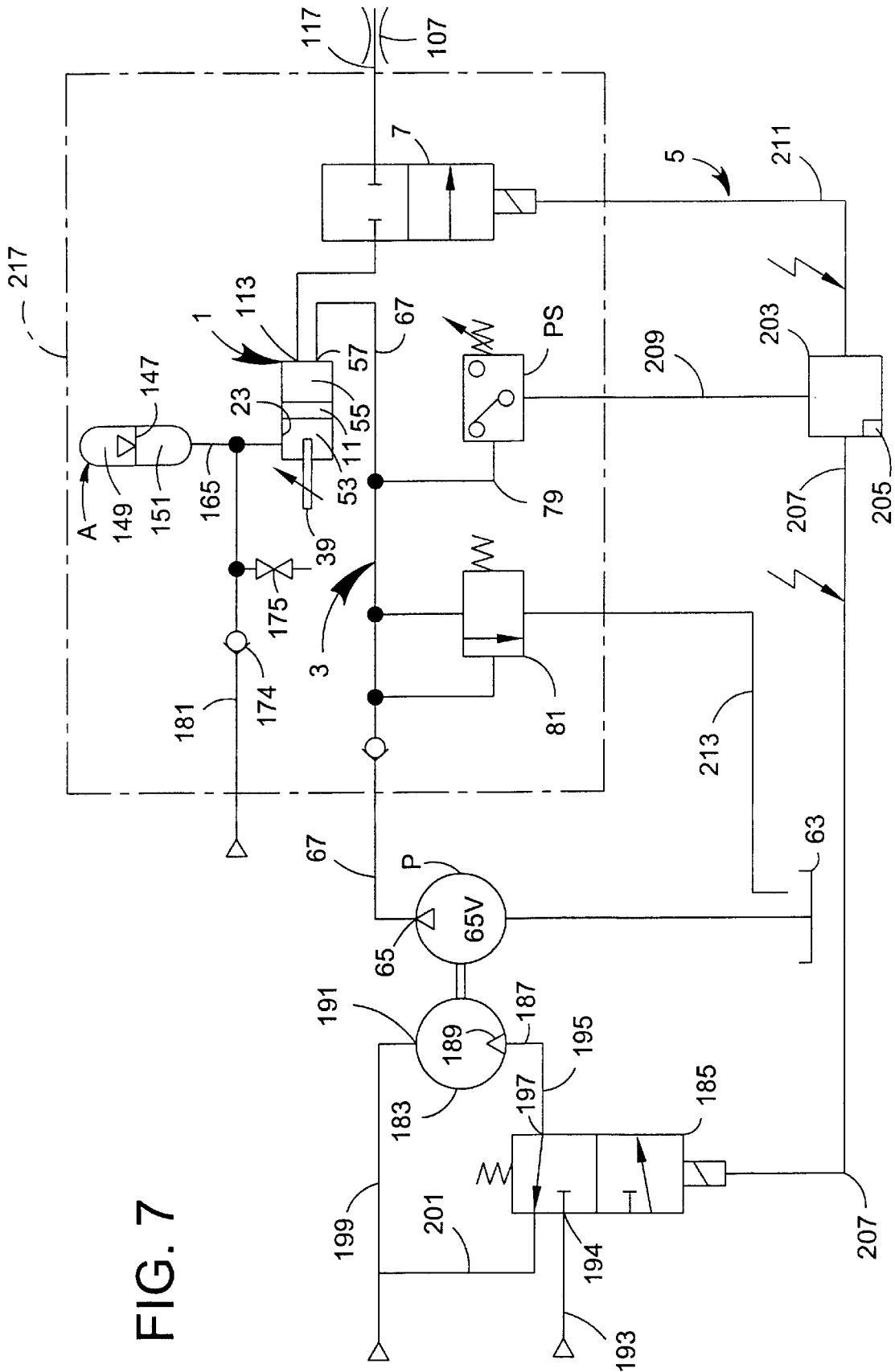
FIG. 7 is a diagrammatic view of the dispensing apparatus of this invention in its entirety including the dispenser, the system for supplying fluid (lubricant) thereto, the system for delivery of fluid (lubricant) from the dispenser, and the energy accumulator.

Referring to the drawings, which illustrate a preferred embodiment of the invention, a dispenser for ejecting a measured volume of fluid on each operation thereof is indicated in its entirety by the reference numeral 1. The dispenser is adapted for connection thereof and is shown in FIG. 7 as connected in a system designated in its entirety by the reference numeral 3 including a pump P for supplying fluid to be ejected thereby with the fluid so supplied under pressure for charging the dispenser with said fluid to be dispensed. A system designated in its entirety by the reference numeral 5 (FIG. 7) is provided for delivery (ejection) of the stated measured volume of fluid on each actuation of the dispenser. This system 5 includes a discharge valve 7 adapted to be closed for the charging of the dispenser 1 and to be opened for ejection of said measured volume of the fluid by the dispenser 1. An energy accumulator indicated in its entirety by the reference character A is provided for accumulating energy (power) for actuating the dispenser 1 to eject the stated volume of fluid (the charge), said accumulator being accumulative, i.e., adapted to accumulate, of the stated dispenser-actuable energy in response to the supplying of fluid under pressure to the dispenser for charging it.

In the specific aspect of the invention, the fluid which the dispenser 1 is to eject in measured volume on each actuation is a lubricant, such as one of the special greases above mentioned. For blast hole drill tube connection lubrication purposes, the volume may range from 0.5 cubic inch to 2.00 cubic inches, depending upon the size of the threaded connection, the dispenser being constructed in a manner for such volume adjustment as will appear. Broadly, the dispenser is an expansible chamber device having a rearward and a forward aspect and a member 11 movable in the device between a rearward retracted position and a forward position. More particularly, the dispenser 1 (the expansible chamber device) is a cylinder and piston device comprising a body or block 13 having a bottom 15, top 16, sides 17 and 18, side 17 being referred to as the right side, a rearward end 19 and a forward end 21, the body or block being formed with a cylindric bore 23 (FIG. 4) extending from its rearward end 19 toward but terminating somewhat short of its forward end 21. The bore 23 is drilled with its axis extending horizontally in the central vertical plane of the body adjacent the bottom 15 of the body and constitutes the cylinder of the cylinder and piston device, said device having piston 11 (the movable part) slidably reciprocal in sealed relation in the cylinder between the retracted position in which it is shown in solid lines in FIG. 4 adjacent the rearward end of the cylinder and a forward position such as shown in phantom in FIG. 4. The forward movement of the piston from its said retracted to its said forward position may be referred to as its forward delivery or ejection stroke, and its rearward movement from its forward position back to its retracted position may be referred to as its return stroke.

As shown, the piston 11 has a central portion 25 of a diameter corresponding to the internal diameter of cylinder 23 and rearward and forward reduced diameter extensions 27 and 29 having slightly enlarged tapered ends. The piston is provided with suitable seals such as indicated at 27s and 29s surrounding the piston extensions for sealing slidably against the surface of the cylinder 23. The rearward side of the seal 27s and the rearward side of the rearward extension 27 constitute the rearward side or face of the piston; the forward side of the seal 29s and the forward extension 29 constitute the forward face or side of the piston.

The rearward retracted position of the piston 11 (solid lines, FIG. 4) is determined by engagement of the end of the rearward extension 27 of the piston with a stop 31 at the rearward end of the cylinder 23. The stop is adjustable axially of the cylinder to vary the retracted position of the piston thereby to vary the volume of lubricant ejected on a delivery or ejection stroke of the piston. As shown, the stop 31 comprises a relatively short length of rod slidable axially with respect to the cylinder in a bore 33 in a fitting 35 threaded as indicated at 37 in the rearward end of the cylinder, the stop (the rod) being backed by an adjusting screw 39 threaded in an axially extending tapped hole 41 in the fitting with a lock nut 43 for locking the screw in axially adjusted position. The forward end of bore 33 is tapered as shown in FIG. 4. The fitting has a hexagonal head 47 for application of a tool for threading it in the rearward end of the cylinder and is formed for provision of a seal 49 for sealing it in place. A seal 51 is provided for the stop (the rod) 35 in bore 33. The arrangement is such that by adjusting the screw 39 to hold the stop from backing off (moving rearward) in the fitting 35 from a selected position with respect to the fitting, different selected retracted positions may be determined for the piston, the retracted position being determined by engagement of the rearward end of the rearward extension 29 of the piston with the forward end of the stop and engagement of the stop with the screw 39.

The piston 11 divides the space in cylinder 23 into a forward expansible and contractible chamber 53, which may be referred to as the first chamber, and a rearward expansible and contractible chamber 55 which may be referred to as the second chamber. The body (or block) 13 has an inlet 57 for lubricant under pressure in its forward end 21 and passaging 59 (FIG. 5) providing communication from the inlet to the stated first or forward chamber 53 in cylinder 23. The body 13 is adapted for connection thereof and is shown in FIG. 7 as connected in the system, indicated as aforesaid at 3 in its entirety, for supplying lubricant under pressure to the forward (first) chamber 53, the pressurized lubricant supplied to chamber 53 being operable to drive the piston 11 rearward to its retracted position against the forward end of stop 31 and thereby to expand and fill the forward (first) chamber 53 for a dispensing operation. Thus, pressurized lubricant delivered by pump P (see FIG. 7) to said forward chamber 53 is operable to drive the piston 11 rearward to its retracted position determined by engagement of the piston (more particularly by engagement of the rearward end of piston extension 27) with the stop 31, thereby to expand the forward chamber 53 which becomes filled with lubricant.

The above-noted system 3 (diagramed in FIG. 7) for supplying lubricant (the fluid to be ejected) under pressure to the dispenser 1 for ejection thereby is shown primarily to comprise the pump P which takes in lubricant from a lubricant supply indicated diagrammatically at 63 (the lubricant reservoir or container). The pump has an outlet indicated at 65, which may have an outlet check valve as indicated at 65v, connected as by the lubricant supply line indicated at 67 to inlet 57 of the dispenser 1 for charging the dispenser. The inlet 57 is at the forward end of the dispenser body. Extending rearward from the inlet in the body is passaging 71 (FIG. 5) leading to cross-passaging 73 including an inlet check valve indicated in its entirety at 75, from which cross-passaging a passage 77 extends generally tangentially with respect to passage 73 forward from the latter to a vertical passage 79. Passage 77 is drilled in to passage 79 from the forward end 21 of the body 13 and is provided at its outer end (at the forward end of the body) with a pressure relief valve 81 adapted to relieve pressure in passage 79 should it become excessive-over 4000 psi, for example. Valve 81 is a conventional pressure relief valve such as a Model 90942 valve sold by Lincoln Industrial, of St. Louis, Mo. It will be observed that the vertical passage 79 is offset from the vertical plane of the axis of cylinder 23 toward the right side 17 of the body 13 although appearing in FIG. 4 as in the same vertical plane as said axis in FIG. 4 for convenience of illustration.

Passage 79 extends down to a bore 83 (see FIGS. 4 and 6) which extends transversely with respect to the body 13 somewhat forward of the forward end of the cylinder 23. Bore 83 is drilled into the body 13 from the right side 17 of the body, terminating short of the left side 18. The vertical passage 79 and bore 83 are coplanar in a vertical transverse plane of the body somewhat forward of the forward end of the cylinder. A fluid pressure (lubricant) switch PS such as a Model 92201-BB3 switch sold by Barksdale of Los Angeles, Calif. is sealingly secured at its lower end on top of the body 13 in a pipe thread 79c at the upper end of passage 79. A passage or port 85 (see FIG. 6) extends rearward from the bore 83 to the forward end of the cylinder 23 providing communication between them. The arrangement is such that lubricant delivered under pressure to the dispenser inlet 57 by the pump P via line 67 flows through passage 71 to passage 73, opens the inlet check valve 75, flows through passage 77 to vertical passage 79, thence via bore 83 and passage or port 85 into the forward end of cylinder 23. The pressure switch PS, which is normally open, is closed when the pressure reaches a predetermined value. The pressure switch PS may be set at the factory to close at a fixed pressure, or it may be field adjustable to vary the pressure at which the switch closes.

As shown in FIG. 5, the inlet check valve 75 comprises a valve seat 87 press fitted into a fitting 91 that is upstream from passage 71. The fitting 91 is threaded in and closes the outer end of passage 73 and has a bore 93 in which a valve ball 95 is movable into and out of engagement with the seat, being biased to closed position engaging the seat by a coil compression spring 99. The fitting has a reduced-diameter section 101 providing an annular chamber 103 around said section in passage 73, the tangential passage 77 extending forward from the lower region of this chamber to said vertical passage 79. The fitting 91 has radial ports such as indicated at 105 communicating with annular chamber 103. Seals for the inlet check valve are indicated at 106. The arrangement is such that lubricant delivered under pressure to the dispenser inlet 57 flows through passage 71 into passage 73, opens the ball 95 against the bias of spring 99, flows through the bore 93 of the fitting 91, and then flows through radial ports 105, chamber 103 and passages 77 and 79, bore 83 and passage (port) 85 into the forward end of the cylinder 23 (i.e. into the forward expansible chamber 53 of the cylinder). The forward chamber 53 of the cylinder is thus charged with lubricant, the charge being a metered (measured) volume (or charge) as will be later explained.

The system indicated in its entirety by the reference numeral 5 is provided for the flow of the metered (measured) volume of lubricant constituting the charge of lubricant from the forward chamber 53 of the cylinder 23, i.e. for ejection of said metered volume of lubricant from cylinder 23, for being sprayed via a spray nozzle 107 (FIG. 6) on a drill tube threaded connection 109 to be lubricated on forward movement of piston 11 from its retracted position through a forward (delivery) stroke. This system includes a lubricant outlet passage 111 in body 13 for flow of lubricant from the forward chamber 53 via bore 83 to a lubricant outlet 113 in the forward end 21 of body 13, with discharge valve 7 mounted in said bore 83 on the right side of 17 of the body 13. The spray nozzle 107 is at the end of a lubricant line 117 connected to the lubricant outlet 113. The line 117 may comprise a short nozzle adapter shown in FIG. 6 or a long line for spraying at a location remote from the body 13. The spray nozzle can, if so desired, be configured to provide a selected fluid spray pattern, such as nozzle Model No. TP 2500080 TC sold by Spraying Systems Co., of Wheaton, Ill. The spray nozzle preferably has a removable spray tip with an orifice which is sized and configured for providing a desired spray pattern. To change the pattern, the tip is simply replaced with a different tip. The discharge valve 7 is a solenoid valve adapted to be closed when de-energized to block flow of lubricant to the spray nozzle so as to enable the supply of the forward cylinder chamber 53 with lubricant and to be opened on being energized for the delivery of said metered volume of lubricant (the charge) to and through the spray nozzle 107 onto the threaded connection 109 to be lubricated (the point of lubrication). The discharge valve 7, or accumulator A, among other elements, can be located remote from the body 13 without departing from the scope of the present invention.

Figure 1:
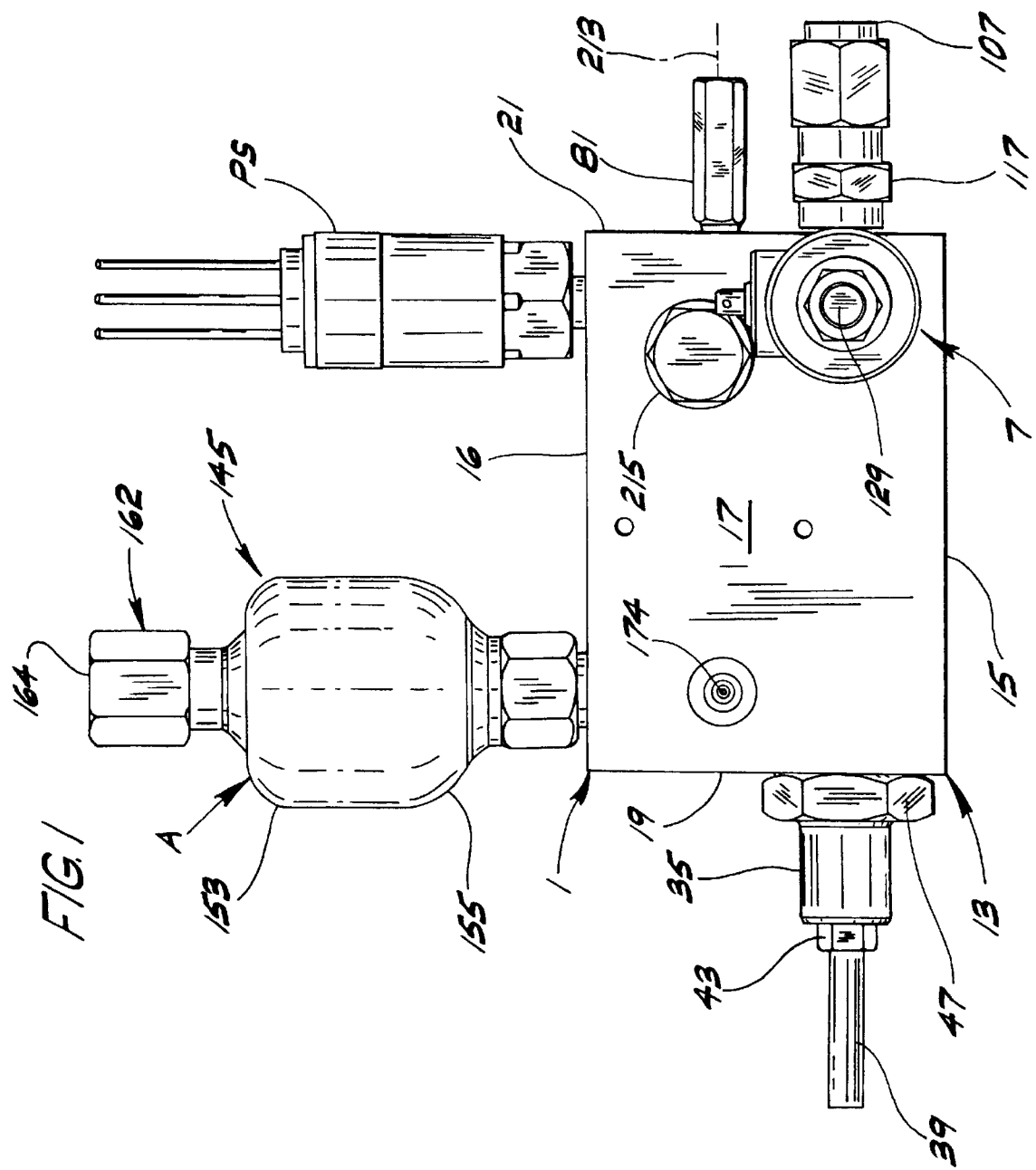
FIG. 1 is a view in elevation of one side of a dispenser of the invention (this side being referred to as the right side)
Figure 2:
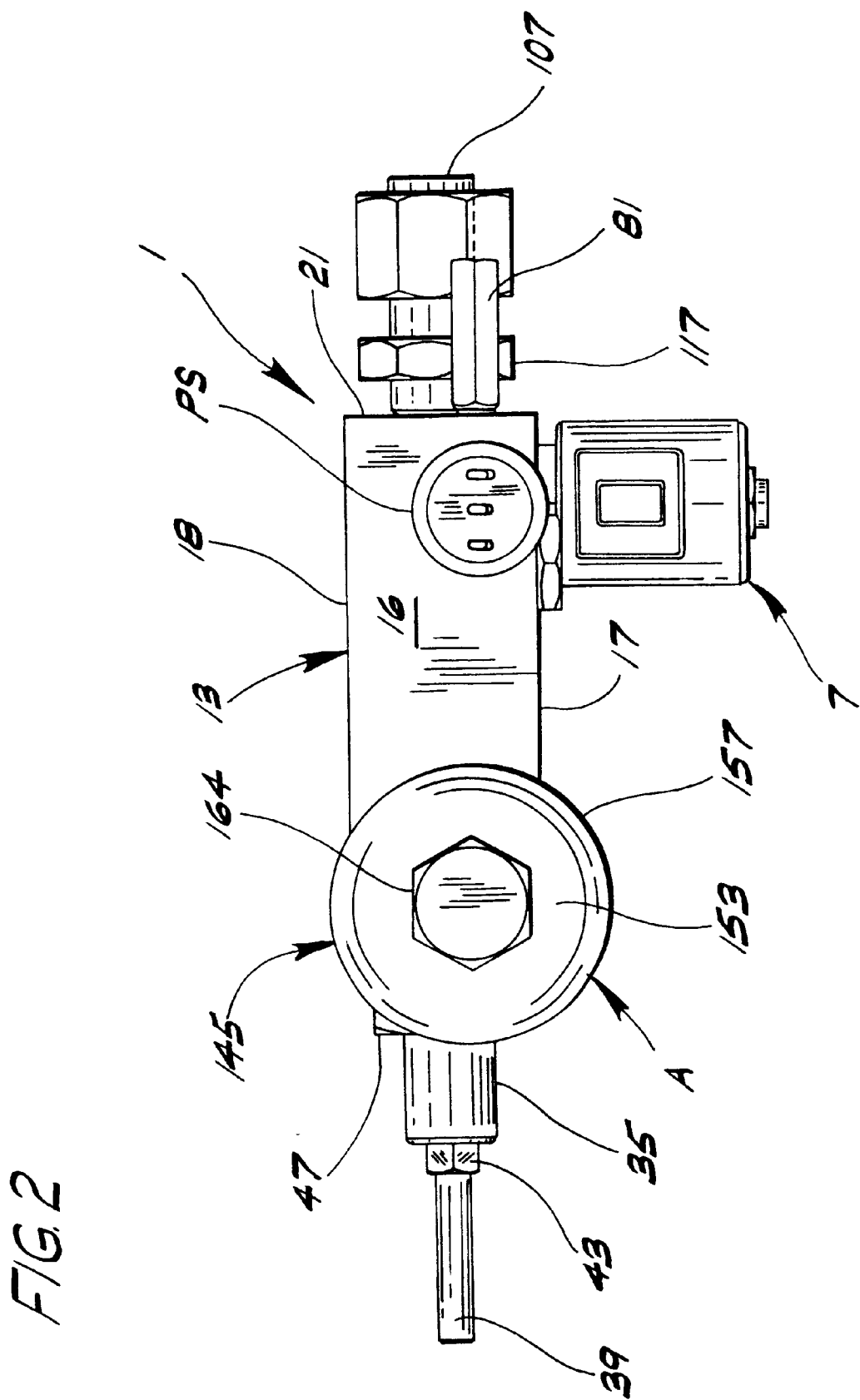
FIG. 2 is a view in plan of the dispenser.

As shown in detail in FIG. 6 the discharge valve, such as model # SV58-26-0-P-00, manufactured by Hydraforce Inc., of Lincolnshire, Ill., comprises a non-magnetic core 119 having a hexagonal head 121 and a threaded extension 123 threaded in the outer end of the bore 83 with a seal 124. It further comprises a coil 125 on the core and a magnetic valve member 127 slidable in a bore 129 in the core, the valve member comprising an elongate magnetic rod actuable by energization of the coil having a tapered tip 131 engageable with (and disengageable from) a valve seat 133 lodged in a reduced-diameter inner end of core extension 123 with a seal 137. The core extension 123 has a reduced diameter section providing an annular chamber 139 in passage 83. The core extension 123 has radial ports 141 that permit flow of lubricant from the annular chamber 139 to outlet passage 111. The passage or port 85 provides for communication between the annular chamber 139 and the forward end of the cylinder 23 (the forward chamber 53 of the cylinder). The aforesaid vertical passage 79 extends down to the annular chamber 139. As shown in FIGS. 1–3 the discharge valve 7 is mounted on the right side 17 of the body 13 and functions to close and open communication between the forward end of the cylinder 23 and outlet 113. However, in FIG. 7 the discharge valve 7 is shown in line downstream from the body 13 for convenience of illustration.

Mounted on top of the body 13 (along with pressure switch PS) is the energy accumulator A, which may also be referred to as a power accumulator, for accumulating energy (power) for driving the piston 11 forward in cylinder 23 through a forward delivery stroke (after expansion and filling of forward chamber 53 of the cylinder) to eject the stated metered volume of lubricant, delivering it through spray nozzle 107. Accumulator A is accumulative of piston-driving energy (power) in response to the supplying of lubricant under pressure to the forward chamber 53. For this purpose, the accumulator is a pressurized gas device, which acts to accumulate energy (power) for actuating the piston 11 (the "movable member") through a delivery stroke in response to the supplying of lubricant under pressure to the forward chamber 53 of the cylinder 23. Thus, the accumulator A acts like a compression spring, storing energy on compression of the spring, or like a tension spring, storing energy on tensioning thereof, all in response to movement of the piston from its forward to its retracted position on loading of the forward expansible and contractible chamber 53 (with the resultant expansion of the forward chamber 53 and contraction of the rearward chamber 55). The accumulator of the present invention may comprise a spring or other alternate type of device for storing energy without departing from the scope of this invention.

In detail, the accumulator A comprises a hollow body 145 having what in a broad sense amounts to a movable partition or separator 147 therein dividing the space in the hollow body into an expansible and contractible gas chamber 149 on one side (the top side as illustrated) of the separator and an expansible and contractible chamber 151 for hydraulic fluid such as oil on the other side (the bottom side) of the separator. The movable separator 147 is specifically a flexible diaphragm made of nitrile, for example, with a corrugation for flexibility, and will be so referred to hereinafter. The hollow body 145 is made up of an upper generally cup-shaped or bell-shaped part 153 disposed open end down and a lower generally cup-shaped or bell-shaped part 155 disposed open end up, the diaphragm being sealingly clamped all around its peripheral margin between the open ends of the members 153 and 155. The cup-shaped parts are held together with the margin of the diaphragm clamped between members 153 and 155, which are welded together.

The gas chamber 149 which is the upper of the two chambers 149 and 151 as the accumulator A is mounted on top of the body 13, is charged with gas, e.g. nitrogen, under pressure, e.g. 1500 psi, and up to 2000 psi. The upper cup-shaped part 149 has a suitable check valve means such as indicated at 162 at the top for the charging of chamber 149 with the nitrogen (or other gas). This gas charge is a precharge, done at the place of manufacture, and is a permanent charge, sealed in the gas chamber 149 so that further recharging is seldom if ever ordinarily needed. The check valve means 162 is illustrated as having a spring-biased ball check 163 and a screw-threaded cap 164 (resembling a conventional tire valve).

Adjacent its rearward end 19 the dispenser body 13 has a vertical passage 165 (see FIG. 4) with a thread 167 at its upper end, this passage extending down to cylinder 23 adjacent the rearward end of the cylinder in the same vertical longitudinal plane as the vertical longitudinal plane of passage 79 (offset to the right of the vertical longitudinal plane of the axis of cylinder 23), although appearing in FIG. 4 as being in the same vertical plane as said axis for convenience of illustration. The accumulator A has a necked-down lower end 169 threaded on a tubular fitting 171 in turn threaded in the thread 167 with seals as indicated at 173 for the mounting of the accumulator A on the top of the body 13.

The hydraulic fluid (oil) chamber 151, the tubular fitting 171, the lower part of the thread 167 below the lower end of the fitting, the vertical passage 165 and the rearward chamber 55 of the cylinder 23, are charged with hydraulic fluid such as oil. This charge may be regarded as a permanent charge, effected at the place of manufacture of the dispenser 1 via a charging check valve 174 (FIG. 1) placed in a pipe thread in side 17 of body 13 which connects with passage 165. The check valve 174 may have a conventional valve ball and spring design, such as Lincoln model 130021-3, and it is arranged to open for the charging operation and to close via spring bias or pressure of hydraulic fluid (oil) in passage 165. In FIG. 7, there is shown a line 181 for the charging operation, check valve 174 being shown in line 181 for convenience of illustration.

A discharge valve 175 (FIG. 4), comprising a valve seat 177, valve ball 179, and a threaded plug 180 (or set screw), are placed in a threaded hole in rearward end 19 that connects to passage 165. In normal operation the valve ball 179 is held against seat 177, and the plug prevents any leakage of fluid. If the accumulator A unit is to be serviced, the hydraulic charge may be released to atmosphere by loosening the plug 180. This will allow the hydraulic pressure to move the ball 179 off the valve seat 177 and around the ball, out to atmosphere.

In dispensing apparatus of this invention for spraying lubricant such as grease on the part to be lubricated, the pump P is what is termed a lance pump for pumping lubricant from a drum containing lubricant, more particularly a pump of the type shown in the co-assigned U.S. patent application Ser. No. 09/151,526 filed Sep. 11, 1998 entitled Pump and especially a pump sold by the assignee's related company Lincoln Industrial, of St. Louis, Mo., under the trademark FLOW MASTER, Model No. 85483. This pump is driven by a rotary hydraulic motor indicated at 183 in FIG. 7, preferably a rotary hydraulic motor such as a Roller Vane rotor hydraulic motor sold by Parker Hannifin Corp. of Greeneville, Tenn., U.S.A. The hydraulic motor is under control of a solenoid valve 185. The hydraulic motor has an inlet indicated at 187 with an inlet check valve indicated at 189 and an outlet indicated at 191 (all in FIG. 7). A line 193 for supplying the motor with hydraulic fluid under pressure from a source thereof (not shown) is connected to an inlet 194 of the solenoid valve 185 and a line 195 extends from an outlet 197 of the valve to the inlet 187 of the motor. At 199 is shown a hydraulic fluid return line extending from the outlet 191 of the motor 183 back to the source (not shown) of motor-operating hydraulic fluid. This source may be one such as typically associated with drilling operations such as described above, e.g. a standard hydraulic fluid pump operable to pump hydraulic fluid from a sump, with return of said fluid to the sump. The solenoid valve 185 is connected in a line 201 by-passing the motor 183, the arrangement being such that the solenoid valve, when de-energized, acts to effect a by-pass via 199, 201, the valve and line 197 around the motor 183 as shown in FIG. 7, and when energized acts to deliver hydraulic fluid from the aforesaid source under pressure via line 195 to operate the motor and drive the pump P.

Referring to FIG. 7, there is indicated at 203 a controller with which is associated a push button control switch 205 (a manually operable switch) operable to start a cycle of operation of the apparatus to be described. The switch 205 may be an illuminated switch having a lamp under the control of the controller 203. When energized, the lamp illuminates the switch 205 to indicate that the system is ready to start a cycle of operation. The lamp is de-energized to indicate that the system is not ready to start a cycle, as will be described. A controller which has been used for the apparatus is a "Logo" Model 24R controller sold by Siemens A. G. Automation and Drives Division of Nuremberg, Germany. The controller is connected in a circuit indicated at 207 with the pump-motor-controlling solenoid valve 185, also connected in a circuit indicated at 209 with the pressure switch PS, and further connected in a circuit indicated at 211 with the discharge valve 7. The pressure relief valve 81, which acts to relieve the forward cylinder chamber 53, passages 85 and 79 and the pressure switch PS of excessive pressure (e.g. 4000 psi) has a lubricant line 213 extending therefrom that is vented to atmosphere. The relief valve 81 is shown in FIG. 7 upstream from dispenser 1 for convenience (rather than at the forward end of the dispenser). It could be located on the left side of the body (at 215, see FIGS. 1 and 3) in communication with passage 79, in which case passage 77 is closed at its outer end by a plug. At 217 in FIG. 7 is indicated in phantom a heated enclosure for the dispenser 1 and associated components 7, PS, 81 and accumulator A.

Assuming piston 11 is in its retracted position back against stop 31 (as shown in solid lines in FIG. 4), further assuming that the forward cylinder chamber 53 is fully charged with lubricant under pressure, that the discharge valve 7 is closed (holding in the charge), the solenoid valve 185 is de-energized and hence set to block flow of hydraulic fluid from line 193 to the pump motor 183, that pressure switch PS is closed by the lubricant under pressure (e.g. 3000 psi) in the cylinder 23 and hence in passage 79, and that the nitrogen gas in the gas chamber 149 of energy accumulator A is under increased pressure over and above its initial pressure, as a result of a previous operation of the apparatus, a cycle of operation of the apparatus may be considered to be initiated by the operator (as in the cab of the drilling equipment) pushing the push button 205 to initiate operation via controller. The controller 203 then acts to carry out a sequence of operations in which, first, the discharge valve 7 is energized and opened by completion of circuit 211 (valve member 127 with its tapered tip 131 is pulled away from seat 133) for discharge of lubricant from the cylinder 23. The piston 11 is driven forward through a delivery stroke by the gas pressure in accumulator chamber 149 acting through the flexible diaphragm 147 on the oil in accumulator chamber 151, counterbore 107, passage 79 and the rearward expansible chamber 55 of the cylinder 23, the piston being driven forward by the act until the forward end of piston extension 29 engages the forward end of the cylinder 23, which acts as a limit stop determining the length of the delivery stroke. As a result, a metered (measured) charge of lubricant equal in volume to the displacement of the piston 11 in the course of its delivery stroke is ejected from the cylinder 23 and delivered via dispenser outlet 113 and line 117 and the spray nozzle 107 for being sprayed on the threaded connection 109 to be lubricated. The delivery stroke may be regarded as the distance traveled forward by the rearward end of the rear piston extension 27 away from the forward end of stop 31, and may be set for whatever stroke and hence whatever volume of delivery is desired, within the limits determined by the length of the cylinder. Typically, the cylinder is of such length and the adjustment of the rearward positioning of the stop 31 by the adjustment screw 39 are such as to be capable of effecting metered discharge of volumes of lubricant ranging from 0.5 cubic inch for the most forward position of stop 31 to 2.0 cubic inches for the most rearward position (as shown in FIG. 4) of the stop.

On delivery of the metered charge of lubricant from the cylinder 23 for the spraying operation, with the resultant drop in pressure in passage 79, pressure switch PS opens and breaks circuit 209. Controller 203 thereupon acts via circuit 211 to close discharge valve 7 to enable recharging the cylinder 23, and circuit 207 is completed to energize the solenoid valve 185, the latter shifting to place line 193 in communication with line 195, thereby supplying the hydraulic motor 183 with hydraulic fluid to drive pump P. The pump P delivers lubricant under pressure via line 67, inlet 57, passages 71 and 73, radial ports 105 (valve ball 95 opening under pressure), annular chamber 103, passages 77, 79 and 85 to the forward chamber 53 of cylinder 23, lubricant thus charging the cylinder, driving piston 11 back to its retracted position (such as shown in solid lines in FIG. 4). When the pressure of lubricant in passage 79 reaches the preset value (e.g. 3000 psi), pressure switch PS closes and this signals the controller 203 via circuit 209 to break circuit 207 and de-energize solenoid valve 185 thereby returning the latter to its condition cutting off flow of hydraulic fluid to motor 183 and stopping pump P. As the piston 11 is driven back to its retracted position, it forces oil out of the rearward chamber of the cylinder 23 and into the oil chamber 151 of the accumulator A thus forcing the flexible diaphragm 147 upward and adding to the compression of the nitrogen gas in gas chamber 149 of the accumulator. Thus, the apparatus resumes the cycle-ready condition (ready for a spray operation) in which piston 11 is in retracted position and cylinder 23 is charged with lubricant, discharge valve 7 is closed holding in the charge, the pump P is off, pressure switch PS is closed, and the accumulator A is ready to supply the energy or force for driving the piston through a delivery stroke on the next cycle by reason of the compressed state of the nitrogen gas in gas chamber 149 of the accumulator.

As noted previously, the lamp illuminating the push button switch 205 is also under operation of the controller 203. The controller turns the lamp on to illuminate the switch 205 (indicating the system is "ready" to spray) when the pump solenoid valve 185 is de-energized to stop the pump, and the controller turns the lamp off (indicating the system is not ready to spray) when the pressure switch PS opens.

The duration of the spray during a cycle can be controlled by using a suitable timing mechanism, such as a timer internal to the controller 203. This timer turns on when the discharge valve 7 is energized and times out a desired spray interval, at the end of which the timer sends a signal to the controller 203 to close the discharge valve and thus stop the spray. The interval timed out by the timer is adjustable so that the duration of the spray can be selected and even synchronized with the motion of an object on which the lubricant is being sprayed. For example, the duration of spray can be synchronized with the rotation of an object being sprayed, such as a rotating shaft having a threaded end, so that the spray continues only for an interval of spray time corresponding to rotation of the object through a predetermined range of rotation. This range may be approximately one revolution of the shaft, thus ensuring that lubricant is applied around the entire circumference of the shaft but not significantly more. For example, for a shaft rotating at 180 rpm or 0.33 second per revolution, the timer could be set to time out a spray duration of 0.33 sec. so that lubricant is applied during only one revolution of the shaft. Alternatively, lubricant could be applied for several revolutions, or only a fraction of a revolution. The spray duration could also be synchronized with other forms of motion, such as linear or curvilinear motion. Also, the controller 203 could operate in an automatic mode in which the successive cycles are started automatically one after another, with a predetermined interval of dwell time between two successive cycles, and the spray duration during each cycle being selected to correspond to a desired range of motion of the object being sprayed.

Figure 8:
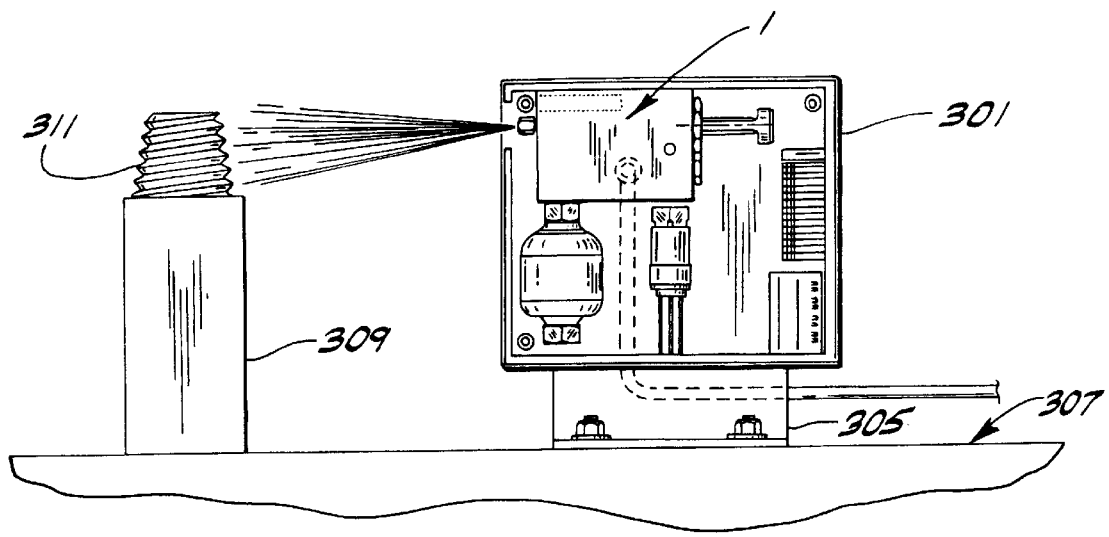
FIG. 8 is a schematic view illustrating a dispenser of the present invention mounted on the frame of a vertical drilling/boring machine for spraying the threaded end of a drill tube.

FIG. 8 shows a dispenser 1 of the present invention housed in an enclosure 301 mounted on the frame 305 of a vertical drilling/boring machine 307 adjacent a drill tube 309 rotatable to drill vertical holes, such as vertical blast holes. As shown, the drill tube 309 comprises an upper section having a threaded end 311 for connection to the next section of the series of sections making up the drill tube. The drill tube may remain stationary or rotate as it is sprayed.

Figure 9:
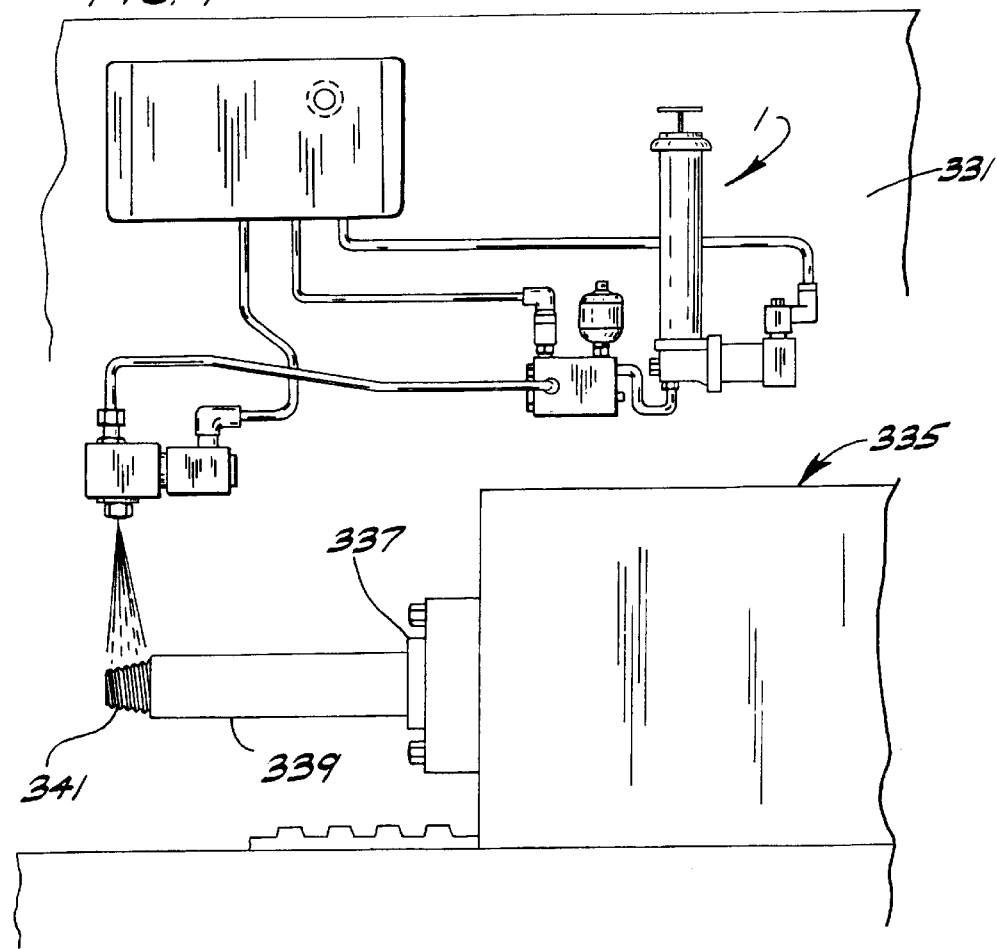
FIG. 9 is a schematic view illustrating a dispenser of the present invention mounted on the chassis of a horizontal drilling/boring machine for spraying the threaded end of a rotating drill tube.

FIG. 9 shows a dispenser 1 of the present invention mounted on the chassis 331 of a directional boring machine 335 which is equipped with a rotatable chuck 337 for holding and rotating a drill tube 339 (sometimes referred to as a drill rod) to bore a hole in a generally horizontal direction, or some angle off horizontal. In this embodiment, the threaded end 341 of a drill tube section is rotated about the axis of the tube 339 (a generally horizontal or angled axis, for example) as the section is sprayed, and the duration of spray is preferably synchronized with the rotation of the drill tube. The synchronization may be carried out in the manner discussed above, or in any other suitable manner.

It will be apparent from the foregoing that the dispenser 1 of the present invention can be adjusted in many different ways to achieve the desired spray patterns. The volume of the spray can be adjusted by adjusting the stop 31. The pressure of the spray can be adjusted by adjusting the pressure switch PS. The pattern of the spray can be adjusted by using different spray nozzles (tips) 107. The pattern of the spray can also be varied by adjusting the temperature of the lubricant, as will be explained in more detail below. The duration of the spray and the dwell time between successive cycles can be adjusted by programming the controller 203 according to circumstances. By using some or all of these features, virtually any desired spray condition can be obtained to suit the particular circumstances at hand.

FIGS. 10–12 shows an alternative embodiment of a dispenser generally designated 401, of the present invention. This dispenser is similar to the dispenser 1 previously described (corresponding parts are designated by corresponding reference numbers), except that the dispenser is equipped with a heater 405 received in a bore 407 in the body 13 of the dispenser. The heater is preferably located close to the forward cylinder chamber 53 for heating a charge of lubricant in the chamber. The heater 405 may be a cartridge heater (e.g., a Chromalox ® electric cartridge heater available from Chromalox Product Service of Ogden, Utah) under the control of a thermostat 411 mounted on the body 13 of the dispenser. The thermostat 411 may be set at the factory at a predetermined, non-adjustable temperature, or it may be field adjustable to vary the temperature to which the dispenser body 13 (and lubricant) is heated. The heater is especially useful in cold climates and in other situations where it may be desirable to reduce the viscosity of the particular lubricant being sprayed.

The dispenser 401 shown in FIGS. 10 and 12 is also equipped with an indicator, generally designated 421, for providing a visual indication that the piston 11 is moving between its forward and rearward positions. The indicator comprises a plunger 423 affixed to the rearward end of the piston, as by a retaining clip 425. The plunger is slidable in a tubular member 427 projecting from the body 13, the forward end of the tubular member having a threaded connection with a fitting 431 threaded into the body. The arrangement is such that the plunger 423 reciprocates with the piston 11. The side wall of the tubular member 427 has openings 435 therein which permit visual viewing of the plunger so that a person may determine whether the piston is reciprocating to pump lubricant from the forward chamber. This feature is especially advantageous if it is otherwise difficult to determine whether the dispenser is in operation, as where the spray nozzle 107 is mounted at a location remote from the body 13 of the dispenser. The rearward end of the plunger is engageable with an adjustment screw 441 threaded in the tubular member 427. This screw 441 has the same function as the stop 31 previously described. The adjustment screw is held in place by a locking screw 443 threaded in the tubular member behind the adjustment screw.

Figure 13:
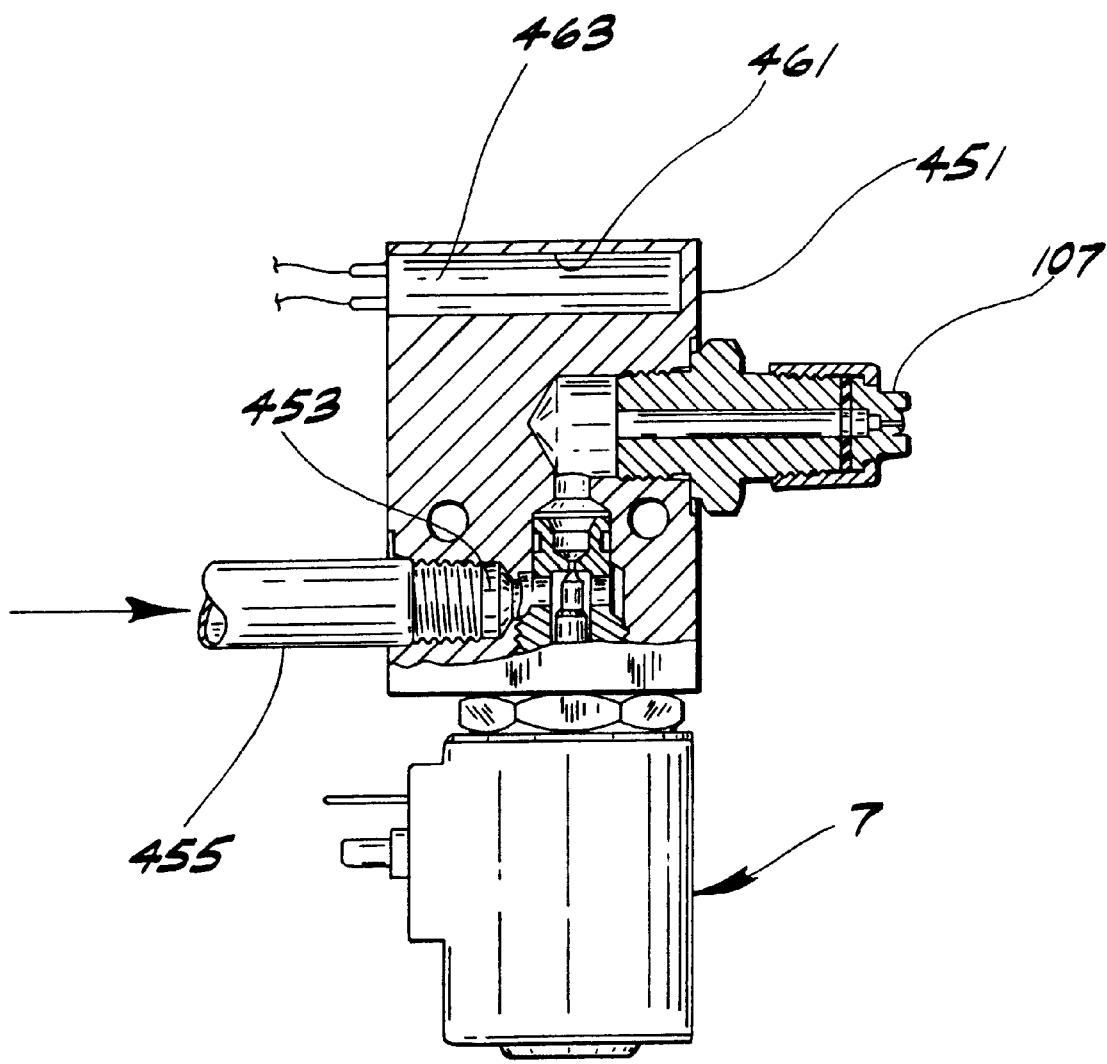
FIG. 13 is a sectional view similar to FIG. 6 showing the spray nozzle mounted in a separate body remote from the portion of the dispenser containing the piston.

FIG. 13 shows an embodiment wherein the spray nozzle 107 is mounted at a location remote from the body of the dispenser. In this embodiment, the spray nozzle and related parts are similar to those described previously (and corresponding parts are designated by corresponding reference numbers), except that the spray nozzle is mounted in a separate body or block 451 having an inlet 453 for supply of lubricant to the nozzle. The inlet 453 is connected to the body of this dispenser by a suitable conduit, such as a flexible hose 455. The block 451 preferably has a bore 461 in it for receiving a heater 463 at a location adjacent the nozzle 107. This heater 463 is similar to heater 405 described above and functions to heat lubricant before it is ejected through the nozzle. The heater 463 is controlled by a thermostat, not shown.

As various changes could be made in the above constructions without departing from the scope of the invention, it is intended that all matter contained in the above description and shown in the accompanying drawings shall be interpreted as illustrative and not in a limiting sense.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

What is claimed is:

1. A method of lubricating an object, comprising the steps of:

ejecting a volume of lubricant under pressure through a spray nozzle, without mixing the lubricant with air under pressure, to generate an airless spray of lubricant;

directing the spray on a rotating object; and synchronizing the duration of spray to the rotation of the object so that the spray continues only for an interval of spray time corresponding to rotation of the object through a predetermined range of rotation;

wherein the object is a threaded shaft comprising a section of drill rod, and wherein said method further comprises spraying said threads during said interval of spray time, said lubricant being ejected through said nozzle at a pressure of 3000 psi or greater;

said method further comprising rotatably mounting said drill rod section in a vertical boring machine and operating the boring machine to rotate the drill rod section.

2. A method of lubricating an object, comprising the steps of:

ejecting a volume of lubricant under pressure through a spray nozzle, without mixing the lubricant with air under pressure, to generate an airless spray of lubricant;

directing the spray on a rotating object; and synchronizing the duration of spray to the rotation of the object so that the spray continues only for an interval of spray time corresponding to rotation of the object through a predetermined range of rotation;

wherein the object is a threaded shaft comprising a section of drill rod, and wherein said method further comprises spraying said threads during said interval of spray time, said lubricant being ejected through said nozzle at a pressure of 3000 psi or greater;

said method further comprising rotatably mounting said drill rod section in a directional boring machine and operating the machine to rotate the drill rod section about a generally horizontal axis.

3. A method of lubricating an object, comprising the steps of:

ejecting a volume of lubricant under pressure through a spray nozzle, without mixing the lubricant with air under pressure, to generate an airless spray of lubricant;

directing the spray on a rotating object; and synchronizing the duration of spray to the rotation of the object so that the spray continues only for an interval of spray time corresponding to rotation of the object through a predetermined range of rotation;

wherein said object is a first object, said method further comprising waiting an interval of dwell time after completion of said spraying and synchronizing steps and then repeating said spraying and synchronizing steps to spray lubricant on a second object.

4. A method as set forth in claim 3 wherein said repeated spraying and synchronizing steps are initiated automatically by a signal from a controller upon termination of said interval of dwell time.

5. A method as set forth in claim 4 wherein said interval of dwell time is adjustable.

6. A method as set forth in claim 3 wherein said spraying step for spraying said second object is initiated manually by activating a switch.

7. A method as set forth in claim 3 wherein said spray is generated by a lubrication dispenser having a spray nozzle with a removable tip having a spray orifice therein, and wherein said method further comprises replacing the removable tip with a different tip to vary the spray pattern applied to the second object.

8. A method as set forth in claim 3 further comprising varying the pressure at which the lubricant is sprayed on the second object compared to the first object.

9. A method as set forth in claim 3 further comprising varying the volume of lubricant sprayed on the second object compared to the first object.

10. A method as set forth in claim 3 wherein said first and second objects are sections of a drill tube, said drill tube sections having threaded ends for connecting the sections to one another, said method further comprising spraying at least one threaded end of each drill tube section prior to connection to other sections of the drill tube.

11. A method of lubricating an object, comprising the steps of:

ejecting a volume of lubricant under pressure through a spray nozzle, without mixing the lubricant with air under pressure, to generate an airless spray of lubricant;

directing the spray on a rotating object;

synchronizing the duration of spray to the rotation of the object so that the spray continues only for an interval of spray time corresponding to rotation of the object through a predetermined range of rotation; and heating the lubricant before it is sprayed.

12. A method of lubricating an object, comprising the steps of:
    ejecting a volume of lubricant under pressure through a spray nozzle, without mixing the lubricant with air under pressure, to generate an airless spray of lubricant;
    directing the spray on a rotating object; and
    synchronizing the duration of spray to the rotation of the object so that the spray continues only for an interval of spray time corresponding to rotation of the object through a predetermined range of rotation;
    wherein said lubricant is sprayed using a dispenser comprising an energy accumulator responsive to the supply of lubricant under pressure to the dispenser to accumulate energy for actuating the dispenser to spray a volume of lubricant on said object, said method further comprising supplying lubricant under pressure to the dispenser to charge it and to cause the accumulator to accumulate energy for actuating the dispenser to effect said spraying step.

13. Lubricant spray apparatus for spraying a rotating object with lubricant, said apparatus comprising:
    a dispenser for spraying a volume of lubricant adapted for connection in a system for supplying lubricant under pressure to the dispenser for charging it with lubricant to be sprayed;
    said dispenser comprising a spray nozzle and an expansible chamber device for ejecting said volume of lubricant under pressure through the spray nozzle, without mixing the lubricant with air under pressure, to generate an airless spray of lubricant;
    a delivery system for delivery of said volume of lubricant to be sprayed by said dispenser, including a discharge valve adapted to be closed for the charging of the dispenser and to be opened for spraying said volume; and
    a controller for controlling the timing of the opening and closing of the discharge valve so that the spray continues only for an interval of spray time corresponding to rotation of the object through a predetermined range of rotation.

14. Lubricant spray apparatus as set forth in claim 13 wherein said expansible chamber device is operable for ejecting said lubricant through said spray nozzle at a pressure of 3000 psi or greater.

15. Lubricant spray apparatus as set forth in claim 13 wherein said predetermined range of rotation is approximately one revolution of the object.

16. Lubricant spray apparatus as set forth in claim 13 wherein said expansible chamber device comprises a body having a cylinder therein, the cylinder having a rearward end and a forward end, and a piston reciprocable in the cylinder between a retracted rearward position and a forward position, said piston dividing the space in the cylinder into a forward expansible and contractible chamber and a rearward expansible and contractible chamber,
    said body being adapted for connection thereof in said delivery system for delivery of said volume of lubricant to be sprayed by the dispenser, said volume being delivered under pressure to said forward chamber, the pressurized lubricant supplied to said forward chamber being operable to drive the piston rearward to its retracted position and to fill said forward chamber, said lubricant being ejected from said forward chamber on forward movement of the piston from its retracted position through a delivery stroke, and
    said dispenser further comprising an energy accumulator for accumulating energy for driving the piston forward through a delivery stroke, said accumulator being accumulative of said piston-driving energy in response to the supplying of lubricant under pressure to said forward chamber and resultant rearward movement of said piston.

17. Lubricant spray apparatus as set forth in claim 16 further comprising a heater for heating said body and thus said lubricant in said forward chamber.

18. Lubricant spray apparatus as set forth in claim 16 having a pressure switch responsive to pressure of lubricant in said cylinder interconnected with said controller, a start switch for the controller to initiate a cycle of operation in which the discharge valve is opened with ensuing ejection of lubricant from the cylinder by the piston moving forward through a delivery stroke, the resultant drop in the pressure of lubricant in the cylinder opening the pressure switch and acting via the controller to close the discharge valve and initiate operation of said delivery system to recharge the cylinder, restoring pressure to close the pressure switch.

19. Lubricant spray apparatus as set forth in claim 18 wherein said start switch is a manually operated illuminated switch.

20. Lubricant spray apparatus as set forth in claim 18 wherein the pressure switch is adjustable to vary the pressure at which lubricant is stored in the forward chamber of the cylinder.

21. Lubricant spray apparatus as set forth in claim 16 wherein said dispenser comprises a spray nozzle adapted to be mounted at a location remote from said body, and a conduit connecting the spray nozzle and said body for the delivery of lubricant to be sprayed from the forward chamber of the cylinder to said spray nozzle.

22. Lubricant spray apparatus as set forth in claim 21 further comprising an indicator attached to said piston and extending out of the body for providing a visual indication that the piston is moving between its forward and rearward positions.

23. Lubricant spray apparatus as set forth in claim 21 further comprising a heater adapted to be mounted at said remote location for heating lubricant sprayed through said spray nozzle.

24. Lubricant spray apparatus as set forth in claim 13 wherein said dispenser further comprises a spray nozzle having a tip with a spray orifice therein, said tip being removable and replaceable by a tip having a different spray orifice therein for varying the pattern of the spray emitted by the dispenser.

25. A directional boring machine for rotating a drill comprising a series of separate longitudinal sections having threaded ends for connection of the sections end-to-end, said boring machine comprising:
    a chassis;
    a system for rotating the drill tube relative to the chassis; and
    dispensing apparatus mounted on said chassis for spraying lubricant on the threaded end of a drill tube section as it rotates.

26. A directional boring machine as set forth in claim 25 wherein said dispensing apparatus comprises a dispenser for spraying a volume of lubricant, a system for supplying lubricant under pressure to the dispenser for charging it with lubricant to be sprayed, a delivery system for delivery of said volume of lubricant to be sprayed by said dispenser, including a discharge valve adapted to be closed for the charging of the dispenser and to be opened for spraying said volume, a spray nozzle through which said volume of lubricant is sprayed, and a controller for controlling the timing of the opening and closing of the discharge valve so that the spray continues only for an interval of spray time corresponding to rotation of the drill rod through a predetermined range of rotation.

27. A directional boring machine as set forth in claim 26 wherein said predetermined range of rotation is approximately one revolution of the drill tube.

28. A directional boring machine as set forth in claim 25 wherein said dispensing apparatus comprises a spray nozzle and means for ejecting a volume of lubricant under pressure through the spray nozzle, without mixing the lubricant with air under pressure, to generate an airless spray of lubricant.

29. A directional boring machine as set forth in claim 28 wherein said dispensing apparatus is adapted for delivering said volume of lubricant to said spray nozzle at a pressure of 3000 psi or greater.

30. A lubrication system for dispensing a lubricant to threads of a drill tube of a horizontal directional boring machine, said system comprising:
- a pumping system comprising a lubricant reservoir, a pump, an applicator, and a lubricant supply conduit coupled between the pump and the applicator; and
- a controller coupled to the pumping system operable in response to an operator signal to activate the pumping system to dispense lubricant over a circumferential surface of the threads of the drill tube.

31. The system of claim 30, further comprising a heater coupled to the pumping system, the heater heating lubricant within the pumping system.

32. The system of claim 30, further comprising a heater coupled to the applicator, the heater heating lubricant within the applicator.

33. The system of claim 30, wherein the applicator comprises a spray applicator.

34. A method of dispensing a lubricant on the threads of a drill tube held by a chuck of a horizontal directional boring machine, said method comprising:
- rotating said chuck and/or drill tube;
- dispensing lubricant to the threads of the drill tube; and
- controlling the dispensing of lubricant to dispense lubricant over a circumferential surface of the threads of the drill tube.

35. The method of claim 34, wherein dispensing the lubricant comprises dispensing a fixed volume of the lubricant.

36. The method of claim 34, wherein dispensing the lubricant comprises dispensing a variable volume of lubricant.

37. The method of claim 34, wherein controlling the lubricant dispensing comprises controlling the lubricant dispensing as a function of drill tube diameter and a preestablished rotation rate.

38. The method of claim 34, wherein dispensing the lubricant comprises spraying the lubricant onto the threads of the drill tube.

39. The method of claim 34, further comprising heating the lubricant.

40. A lubrication system for dispensing a lubricant to threads of a drill tube of a horizontal directional boring machine, said system comprising:
- a pumping system comprising a lubricant reservoir, a pump, an applicator, and a lubricant supply conduit coupled between the pump and applicator;
- a heater coupled to the pumping system, the heater heating lubricant within the pumping system; and
- a controller coupled to the pumping system, the controller, in response to an operator signal, activating the pumping system to dispense a volume of lubricant from the applicator to the threads of the drill tube.

41. The system of claim 40, wherein the heater is coupled to a source of electrical power, the heater generating heat to heat lubricant within the pumping system in response to current received from the electrical power source.

42. The system of claim 40, wherein the pumping system dispenses a fixed volume of lubricant through the applicator.

43. The system of claim 40, wherein the applicator is a sprayer.

44. The system of claim 40, wherein the controller controls a duration of dispensing produced by the pumping system, the dispensing time being proportional to the rotation rate of the drill tube.

45. The system of claim 40, wherein the applicator comprises a nozzle system having orifices of different sizes.

46. The system of claim 40, wherein the controller, in response to a rotation rate of the drill tube, adjusts one or more characteristics of the pumping system to dispense a desired volume of lubricant to the threads of the drill tube.

47. The system of claim 40, further comprising an indicator, the controller activating the indicator to indicate readiness of the lubrication system.

48. A lubrication system comprising a body defining an expansible and contractible chamber, a pump for pumping lubricant to said chamber, a spray nozzle in communication with said chamber, and a device for contracting the chamber to force lubricant out of the chamber and through said spray nozzle at a pressure sufficient to effect spraying of the lubricant, without mixing the lubricant with air under pressure, on a part to be lubricated.

49. A lubrication system as set forth in claim 48 further comprising a heater for heating the body and thus said lubricant in said chamber.

50. A lubrication system as set forth in claim 49 wherein said spray nozzle is remote from said body, said system further comprising a second heater for heating the spray nozzle.

51. A lubrication system as set forth in claim 48 wherein said pressure is 3000 psi or greater.

52. A directional boring machine for rotating a drill tube comprising a series of longitudinal sections having threaded ends for connection of the sections end-to-end, said boring machine comprising a chassis, a system for rotating a drill tube section, and dispensing apparatus mounted on the machine for spraying lubricant on the threaded end of the drill tube as it rotates, said dispensing apparatus comprising a body defining an expansible and contractible chamber, a pump for pumping lubricant to said chamber, a spray nozzle in communication with said chamber, and a device for contracting the chamber to force lubricant out of the chamber and through said spray nozzle at a pressure sufficient to effect spraying of the lubricant, without mixing the lubricant with air under pressure, on a part to be lubricated.

53. A machine as set forth in claim 52 further comprising a heater for heating the body and thus said lubricant in said chamber.

54. A machine as set forth in claim 53 wherein said spray nozzle is remote from said body, said system further comprising a second heater for heating the spray nozzle.

55. A machine as set forth in claim 52 wherein said pressure is 3000 psi or greater.

56. A method of spraying a part with lubricant, comprising pumping lubricant to an expansible and contractible chamber thereby to fill the chamber, and contracting the chamber to force lubricant out of the chamber and through a spray nozzle at a pressure sufficient to effect spraying of the lubricant on said part without mixing the lubricant with air under pressure.

57. A method as set forth in claim 56 wherein said pressure is 3000 psi or greater.

58. A method as set forth in claim 57 further comprising rotating a threaded drill tube, and spraying lubricant on threads of the drill tube as it rotates.

* * * * *

UNITED STATES PATENT AND TRADEMARK OFFICE
CERTIFICATE OF CORRECTION

PATENT NO.     : 6,405,810 B1
DATED          : June 18, 2002
INVENTOR(S)    : Ayzik Grach et al.

It is certified that error appears in the above-identified patent and that said Letters Patent is hereby corrected as shown below:

<u>Column 16,</u>
Lines 45-46, "drill comprising" should read -- drill tube comprising --.

Signed and Sealed this

Fifth Day of November, 2002

Attest:

Attesting Officer

JAMES E. ROGAN
*Director of the United States Patent and Trademark Office*